United States Patent
Li et al.

(10) Patent No.: US 12,520,322 B2
(45) Date of Patent: Jan. 6, 2026

(54) RESOURCE DETERMINING METHOD, RESOURCE DETERMINING APPARATUS, AND COMMUNICATIONS DEVICE

(71) Applicant: VIVO MOBILE COMMUNICATION CO., LTD., Guangdong (CN)

(72) Inventors: Na Li, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 441 days.

(21) Appl. No.: 17/742,216

(22) Filed: May 11, 2022

(65) Prior Publication Data

US 2022/0279570 A1   Sep. 1, 2022

Related U.S. Application Data

(63) Continuation of application No. PCT/CN2020/131339, filed on Nov. 25, 2020.

(30) Foreign Application Priority Data

Nov. 29, 2019   (CN) .................. 201911205264.X (51) Int. Cl.
*H04W 72/04* (2023.01)
*H04L 1/1812* (2023.01)
(Continued)

(52) U.S. Cl.
CPC ........... *H04W 72/23* (2023.01); *H04L 1/1812* (2013.01); *H04L 5/0053* (2013.01); *H04W 72/21* (2023.01)

(58) Field of Classification Search
CPC . H04W 72/23; H04W 72/21; H04W 72/1268; H04L 1/1812; H04L 1/1861;
(Continued)

(56) References Cited

U.S. PATENT DOCUMENTS 9,438,883 B2   9/2016   Oyman
9,584,793 B2   2/2017   Oyman
(Continued)

FOREIGN PATENT DOCUMENTS

CN   109996337 A   7/2019
CN   110061805 A   7/2019
(Continued)

OTHER PUBLICATIONS

First Office Action for Japanese Application No. 2022-527228, dated May 23, 2023, 4 Pages.
(Continued)

*Primary Examiner* — Mahbubul Bar Chowdhury
(74) *Attorney, Agent, or Firm* — BROOKS KUSHMAN P.C.

(57) ABSTRACT

A resource determining method, a resource determining apparatus, and a communications device. The resource determining method is applied to a terminal and includes: determining, based on an offset, the number of resources occupied by joint coding of configured grant uplink control information (CG-UCI) and hybrid automatic repeat request acknowledgment (HARQ-ACK) when the HARQ-ACK is multiplexed on a configured grant physical uplink shared channel (CG-PUSCH) for transmission, where the offset is determined by a first offset and/or a second offset, the first offset is an offset corresponding to the HARQ-ACK, and the second offset is an offset corresponding to the CG-UCI.

8 Claims, 4 Drawing Sheets

---

Determine the number of resources occupied by joint coding of configured grant uplink control information CG-UCI and hybrid automatic repeat request acknowledgment HARQ-ACK, based on an offset when the HARQ-ACK is multiplexed on a configured grant uplink physical shared channel CG-PUSCH for transmission, where the offset is determined by a first offset and a second offset, the first offset is an offset corresponding to the HARQ-ACK, and the second offset is an offset corresponding to the CG-UCI ⸺ 101

(51) Int. Cl.
*H04L 5/00* (2006.01)
*H04W 72/21* (2023.01)
*H04W 72/23* (2023.01)

(58) Field of Classification Search
CPC ... H04L 1/1671; H04L 5/0053; H04L 5/0035; H04L 5/0094; H04L 5/0044; H04L 5/0055; H04L 5/0007; H04L 27/0006
See application file for complete search history.

(56) References Cited

U.S. PATENT DOCUMENTS

| | | | |
|---|---|---|---|
| 12,114,322 B2 * | 10/2024 | Oviedo | H04L 1/1664 |
| 2013/0268577 A1 | 10/2013 | Oyman | |
| 2015/0382264 A1 | 12/2015 | Cho et al. | |
| 2018/0167931 A1 | 6/2018 | Papasakellariou | |
| 2019/0215823 A1 | 7/2019 | Kim et al. | |
| 2020/0280992 A1 | 9/2020 | Takeda et al. | |
| 2020/0344789 A1 | 10/2020 | Gao | |
| 2021/0007129 A1 * | 1/2021 | Talarico | H04W 72/1268 |
| 2021/0050933 A1 * | 2/2021 | Myung | H04L 5/0094 |
| 2021/0051671 A1 * | 2/2021 | Myung | H04W 72/21 |
| 2021/0051702 A1 * | 2/2021 | Bhattad | H04L 5/0055 |
| 2021/0092735 A1 | 3/2021 | Wang et al. | |
| 2021/0092763 A1 * | 3/2021 | Li | H04W 72/21 |
| 2021/0100024 A1 * | 4/2021 | Bang | H04W 72/21 |
| 2021/0105812 A1 * | 4/2021 | Rastegardoost | H04L 1/08 |
| 2021/0160011 A1 * | 5/2021 | Bang | H04L 5/0055 |
| 2021/0400698 A1 * | 12/2021 | Wu | H04L 1/1812 |
| 2022/0174721 A1 * | 6/2022 | Oviedo | H04L 5/0053 |
| 2022/0174722 A1 * | 6/2022 | Talarico | H04W 72/23 |
| 2022/0407617 A1 * | 12/2022 | Myung | H04W 72/21 |

FOREIGN PATENT DOCUMENTS

| | | |
|---|---|---|
| CN | 110063039 A | 7/2019 |
| JP | 2020532250 A | 11/2020 |
| WO | 2016163855 A1 | 10/2016 |
| WO | 2019073966 A1 | 4/2019 |

OTHER PUBLICATIONS

First Office Action for Chinese Application No. 201911205264.X, dated Oct. 22, 2021, 7 Pages.

International Search Report and Written Opinion for Application No. PCT/CN2020/131339, dated Feb. 24, 2021, 9 Pages.

Mediatek Inc., "Remaining Issues on NR-U Configured Grant," 3GPP TSG RAN WG1 #99, Agenda item 7.2.2.2.4, Nov. 18-22, 2019, R1-1912091, Reno, NV, USA, 6 Pages.

LG Electronics, "Discussion on Configured Grant for NR-U," 3GPP TSG RAN WG1 #99, Agenda item 7.2.2.2.4, Nov. 18-22, 2019, R1-1912392, Reno, NV, USA, 9 Pages.

LG Electronics, "Remaining Issues of Configured Grant for NR-U," 3GPP TSG RAN WG1 #100, Agenda item 7.2.2.2.4, Feb. 24-Mar. 6, 2020, R1-2000666, E-Meeting, 6 Pages.

LG Electronics, "Remaining Issues of Configured Grant for NR-U," 3GPP TSG RAN WG1 #100bis, Agenda item 7.2.2.2.4, Apr. 20-30, 2020, R1-2001938, E-Meeting, 3 Pages.

"Technical Specification Group Radio Access Network; NR; Multiplexing and Channel Coding," 3GPP TS-38.212 V16.3.0, Sep. 2020, Release 16, 152 Pages (4 Parts).

Extended European Search Report for Application No. 20869148.5-1216, dated Sep. 7, 2022, 12 Pages.

Jeet, "Vivo's Dual Wi-Fi Acceleration Technology Can Connect Two Networks at Once," GizmoChina, Online Publication Date Jul. 18, 2019, URL: https://www.gizmochina.com/2019/07/18/vivo-dual-wifi-acceleration-technology/, Accessed Aug. 30, 2022, 3 pages.

Sparrow News, "iQoo Dual Wi-Fi Connection," XP No. 55955974, Video Format, Online Publication Date Jul. 18, 2019, URL: https://www.youtube.com/watch?v=1AUCpuwXZTw, Accessed Aug. 30, 2022, 2 pages.

First Office Action for Indian Application No. 202227026547, dated Nov. 10, 2022, 5 Pages.

Extended European Search Report for Application No. 20892869.7-1213, dated Dec. 19, 2022, 12 Pages.

3GPP, "3rd Generation Partnership Project; Technical Specification Group Radio Access Network; NR; Multiplexing and Channel Coding (Release 15)," 3GPP TS 38.212, Sep. 2019, V15.7.0, 101 Pages.

Vivo, "Feature Lead Summary on Configured Grant Enhancement" 3GPP TSG RAN WG1#99, Agenda item 7.2.2.2.4, Nov. 18-22, 2019, R1-19xxxxx, Reno, Nevada, USA, 19 Pages.

Mediatek Inc., "Discussion on NR-U Configured Grant," 3GPP TSG RAN WG1 #98bis, Agenda item 7.2.2.2.4, Oct. 14-20, 2019, R1-1911055, Chongqing, China, 4 Pages.

* cited by examiner

FIG. 1

Determine the number of resources occupied by joint coding of configured grant uplink control information CG-UCI and hybrid automatic repeat request acknowledgment HARQ-ACK, based on an offset when the HARQ-ACK is multiplexed on a configured grant uplink physical shared channel CG-PUSCH for transmission, where the offset is determined by a first offset and a second offset, the first offset is an offset corresponding to the HARQ-ACK, and the second offset is an offset corresponding to the CG-UCI — 101

FIG. 2

Determine the number of resources occupied by joint coding of configured grant uplink control information CG-UCI and hybrid automatic repeat request acknowledgment HARQ-ACK, based on an offset when the HARQ-ACK is multiplexed on a configured grant uplink physical shared channel CG-PUSCH for transmission, where the offset is determined by a first offset and a second offset, the first offset is an offset corresponding to the HARQ-ACK, and the second offset is an offset corresponding to the CG-UCI — 201

RESOURCE DETERMINING METHOD, RESOURCE DETERMINING APPARATUS, AND COMMUNICATIONS DEVICE

CROSS-REFERENCE TO RELATED APPLICATIONS

This application is a continuation of PCT Application No. PCT/CN2020/131339 filed on Nov. 25, 2020, which claims priority to Chinese Patent Application No. 201911205264.X filed on Nov. 29, 2019, which are incorporated herein by reference in their entireties.

TECHNICAL FIELD

The present disclosure relates to the field of communications technologies, and in particular, to a resource determining method, a resource determining apparatus, and a communications device.

BACKGROUND

In new radio (NR), for low-latency service or periodic service requirements, the NR supports a transmission mode of uplink semi-persistent configured grant (CG) to simplify a signaling exchange procedure and ensure low-latency requirements. To better support transmission of a configured grant PUSCH (CG-PUSCH) on an unlicensed band, uplink control information (UCI) carried by the CG-PUSCH, that is, CG-UCI, is introduced.

In a related protocol, because user equipment (UE) is not allowed to simultaneously transmit a physical uplink control channel (PUCCH) and a PUSCH, when the PUCCH and the PUSCH partially or completely overlap in time domain, if a specific time requirement is met, the UCI of the PUCCH is multiplexed by the UE on the PUSCH for transmission. To correctly decode data and UCI on the PUSCH, the number of resource elements (RE) occupied by the UCI and locations of the REs need to be determined according to a specified rule.

SUMMARY

According to a first aspect, an embodiment of the present disclosure provides a resource determining method, applied to a terminal and including:

determining, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and/or a second offset, the first offset is an offset corresponding to the HARQ-ACK, and the second offset is an offset corresponding to the CG-UCI.

According to a second aspect, an embodiment of the present disclosure provides a resource determining method, applied to a network-side device and including:

determining, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and/or a second offset, the first offset is an offset corresponding to the HARQ-ACK, and the second offset is an offset corresponding to the CG-UCI.

According to a third aspect, an embodiment of the present disclosure provides a resource determining apparatus, applied to a terminal and including:

a processing module, configured to determine, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and/or a second offset, the first offset is an offset corresponding to the HARQ-ACK, and the second offset is an offset corresponding to the CG-UCI.

According to a third aspect, an embodiment of the present disclosure provides a resource determining apparatus, applied to a network-side device and including:

a processing module, configured to determine, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and/or a second offset, the first offset is an offset corresponding to the HARQ-ACK, and the second offset is an offset corresponding to the CG-UCI.

According to a fifth aspect, an embodiment of the present disclosure further provides a communications device, where the communications device includes a processor, a memory, and a computer program stored in the memory and running on the processor; and when the processor executes the computer program, the steps of the foregoing resource determining method are implemented.

According to a sixth aspect, an embodiment of the present disclosure further provides a computer-readable storage medium, where the computer-readable storage medium stores a computer program, and when the computer program is executed by a processor, the steps of the foregoing resource determining method are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes example embodiments of the present disclosure in more detail with reference to the accompanying drawings. Although the example embodiments of the present disclosure are shown in the accompanying drawings, it should be understood that the present disclosure may be implemented in various forms and should not be limited by the embodiments set forth herein. On the contrary, the embodiments are provided to enable a more thorough understanding of the present disclosure and completely convey the scope of the present disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The CDMA system can implement radio technologies such as CDMA2000 and universal terrestrial radio access (UTRA). UTRA includes wideband CDMA (Wideband Code Division Multiple Access, WCDMA) and other CDMA variants. The TDMA system can implement radio technologies such as global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies. However, in the following descriptions, an NR system is described for an illustration purpose, and NR terms are used in most of the following descriptions, although these technologies may also be applied to other applications than an NR system application.

The following descriptions provide examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Figure 1:
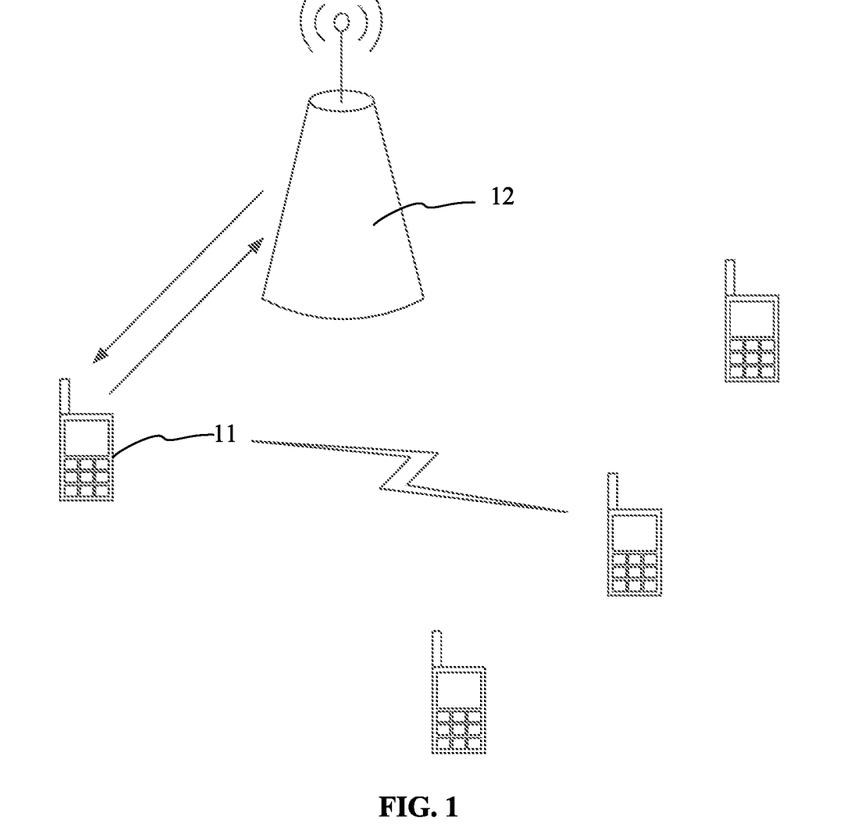
FIG. 1 is a block diagram of a mobile communications system to which an embodiment of the present disclosure may be applied.

FIG. 1 is a block diagram of a wireless communications system to which an embodiment of the present disclosure may be applied. The wireless communications system includes a terminal 11 and a network-side device 12. The terminal 11 may also be referred to as a terminal device or user equipment (UE). The terminal 11 may be a terminal side device such as a mobile phone, a tablet personal computer, a laptop computer, a personal digital assistant (PDA), a mobile internet device (MID), a wearable device, or an in-vehicle device. It should be noted that the specific type of the terminal 11 is not limited in the embodiments of the present disclosure. The network-side device 12 may be a base station or a core network, where the base station may be a base station of 5G or a later version (for example, gNB or 5G NR NB), or a base station in other communications systems (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or some other appropriate term in the art. As long as the same technical effect is achieved, the base station is not limited to a specific technical term. It should be noted that the base station in the NR system is taken only as an example in the embodiments of the present disclosure, but a specific type of the base station is not limited.

The base station may communicate with the terminal 11 under the control of a base station controller. In various examples, the base station controller may be a part of the core network or some base stations. Some base stations may perform communication of control information or user data with the core network by using backhauls. In some examples, some of these base stations may communicate with each other directly or indirectly by using backhaul links. The backhaul links may be wired or wireless communication links. The wireless communications system may support operations on multiple carriers (wave signals of different frequencies). A multi-carrier transmitter can transmit modulated signals on the multiple carriers simultaneously. For example, multi-carrier signals modulated by using various radio technologies may be transmitted on each communication link. Each modulated signal may be transmitted on different carriers and may carry control information (for example, a reference signal or a control channel), overhead information, data, and the like.

The base station may communicate wirelessly with the terminal 11 through one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, such as cellular and WLAN radio access technologies. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying an uplink (UL) transmission (for example, from the terminal 11 to the network-side device 12), or a downlink for carrying a downlink (DL) transmission (for example, from the network-side device 12 to the terminal 11). The UL transmission may also be referred to as reverse link transmission, while the DL transmission may also be referred to as forward link transmission. Downlink transmission may be implemented by using a licensed band, an unlicensed band, or both. Similarly, uplink transmission may be implemented by using a licensed band, an unlicensed band, or both.

In NR, for low-latency service or periodic service requirements, the NR supports a transmission mode of uplink semi-persistent configured grant (CG) to simplify a signaling exchange procedure and ensure low-latency requirements. In the embodiments of the present disclosure, resources for configured grant transmission may be semi-persistently configured by radio resource control (RRC) signaling, and when data of a service arrives, UE may transmit the data on a configured grant physical uplink shared channel (PUSCH). To better support configured grant PUSCH (CG-PUSCH) transmission on an unlicensed band, uplink control information (UCI) carried by the CG-PUSCH, that is, CG-UCI, is introduced, for example, a hybrid automatic repeat request (HARQ) identity (ID), a new data indicator (NDI), a redundancy version (RV), and other information. To be specific, the UE determines the foregoing parameters and transmits the parameters to a base station over the CG-PUSCH, and the base station decodes the CG-PUSCH based on these parameters.

In the embodiments of the present disclosure, because the UE does not support simultaneous transmission of a physical uplink control channel (PUCCH) and a PUSCH, when the PUCCH and the PUSCH partially or completely overlap in time domain, if specific time requirements are met, the UCI on the PUCCH is multiplexed by the UE on the PUSCH for transmission. The UCI includes HARQ-acknowledgment (ACK) and channel state information (CSI), and the CSI may include CSI part 1 and CSI part 2. When the UCI is transmitted on the PUSCH, different types of UCI (HARQ-ACK, CSI part 1, and CSI part 2) are coded separately. In addition, to correctly decode data and UCI on the PUSCH, the number of resource elements (RE) occupied by the UCI and locations of the REs need to be determined according to a specified rule. The number of REs occupied by the UCI is associated with the number of UCI bits, and also depends on parameters betaOffset (RRC configuration or an activation downlink control information (DCI) indication after RRC configuration) and alpha (RRC configuration).

In NR in an unlicensed spectrum (NR in Unlicensed Spectrum, NRU), because the CG-UCI also needs to be transmitted on the CG-PUSCH, to control the number of REs occupied by the CG-UCI transmitted on the CG-PUSCH, a new RRC parameter (such as betaOffsetCG-UCI-r16) is introduced and an associated HARQ-ACK resource determining method is used, for example, one value of the RRC configuration, an RRC configuration candidate value set, and the activation DCI indication. If different types of UCI (including HARQ-ACK, CSI part 1, and CSI part 2) are multiplexed on the CG-PUSCH for transmission and different types of information are coded separately, at most 4 types of information may be coded separately, including: CG-UCI, HARQ-ACK, CSI part 1, and CSI part 2, which increases UE implementation complexity. In order not to increase the UE implementation complexity, it is limited in the NRU that at most three types of UCI are coded separately on the CG-PUSCH. When time-domain resources of a HARQ-ACK PUCCH and the CG-PUSCH overlap, an RRC parameter (such as cg-CG-UCI-Multiplexing) configures whether the HARQ-ACK is multiplexed on the CG-PUSCH for transmission. When multiplexing is configured by RRC and the HARQ-ACK is multiplexed on the CG-PUSCH for transmission, the CG-UCI and the HARQ-ACK are jointly coded (such as cg-CG-UCI-Multiplexing='enable') and multiplexed on the CG-PUSCH by using an associated HARQ-ACK mapping method. Otherwise, the PUSCH is skipped (that is, the CG-PUSCH is not transmitted), and the HARQ-ACK PUCCH is transmitted.

In the NRU, when the configured-grant PUSCH (CG-PUSCH) and the PUCCH overlap, on the configured-grant PUSCH, not only the CG-UCI is to be transmitted, but also the UCI including the HARQ-ACK and/or the CSI may be transmitted. When the HARQ-ACK is not multiplexed on the CG-PUSCH, the CG-UCI is individually coded. When the HARQ-ACK is multiplexed on the CG-PUSCH, the CG-UCI and the HARQ-ACK are jointly coded.

In the embodiment of the present disclosure, an offset corresponding to the CG-UCI and an offset corresponding to the HARQ-ACK are configured or indicated in the RRC parameter or the DCI indication. When the CG-UCI and the HARQ-ACK are jointly coded, an offset to be used may be determined based on the offset corresponding to the CG-UCI and the offset corresponding to the HARQ-ACK, and then based on the determined offset, the number of REs occupied by joint coding of the CG-UCI and the HARQ-ACK is determined, so that the network-side device can correctly decode the CG-UCI and the HARQ-ACK, and effectiveness of communication is improved.

The following details the embodiments of the present disclosure with reference to the accompanying drawings.

Figure 2:
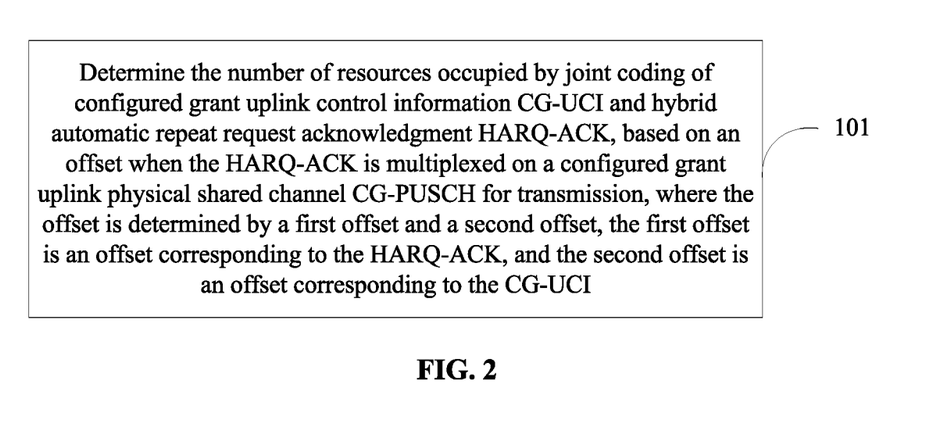
FIG. 2 is a schematic flowchart of a resource determining method of a terminal according to an embodiment of the present disclosure.

An embodiment of the present disclosure provides a resource determining method applied to a terminal and, as shown in FIG. 2, including the following steps.

Step 101: Determine the number of resources occupied by joint coding of configured grant uplink control information CG-UCI and hybrid automatic repeat request acknowledgment HARQ-ACK, based on an offset when the HARQ-ACK is multiplexed on a configured grant physical uplink shared channel CG-PUSCH for transmission, where the offset is determined by a first offset and a second offset, the first offset is an offset corresponding to the HARQ-ACK, and the second offset is an offset corresponding to the CG-UCI.

In this embodiment, when the HARQ-ACK is multiplexed on the CG-PUSCH for transmission, the terminal and the network-side device can determine the offset based on the first offset corresponding to the HARQ-ACK and the second offset corresponding to the CG-UCI, and determine, based on the offset, the number of resources occupied by joint coding of the CG-UCI and the HARQ-ACK, so that the network-side device can correctly decode the CG-UCI and the HARQ-ACK, and effectiveness of communication is improved.

Optionally, the offset is any one of the following:
the first offset;
the second offset;
a larger value of the first offset and the second offset;
a smaller value of the first offset and the second offset;
an average value of the first offset and the second offset; and
a weighted average value of the first offset and the second offset.

When the offset is the average value of the first offset and the second offset, and the offset $\beta_{offset}^{PUSCH}=(\beta_{offset}^{CG-UCI}+\beta_{offset}^{HARQ-ACK})/2$, where $\beta_{offset}^{CG-UCI}$ is the offset corresponding to the CG-UCI, and $\beta_{offset}^{HARQ-ACK}$ is the offset corresponding to the HARQ-ACK.

When the offset is the weighted average value of the first offset and the second offset, the weighted average value is obtained after weighting is performed based on the number of HARQ-ACK bits and the number of CG-UCI bits.

That is $\beta_{offset}^{PUSCH}=(\beta_{offset}^{CG-UCI}*O_{CG-UCI}+\beta_{offset}^{HARQ-ACK})/(O_{CG-UCI}+O_{HARQ-ACK})$.

Herein, $O_{CG-UCI}$ and $O_{HARQ-ACK}$ are the number of CG-UCI bits and the number of HARQ-ACK bits respectively.

In an example embodiment of the present disclosure, the first offset is configured by radio resource control RRC signaling; or the first offset is indicated by downlink control information (DCI).

In an example embodiment of the present disclosure, the second offset is configured by RRC signaling; or
the second offset is indicated by DCI.

Figure 3:
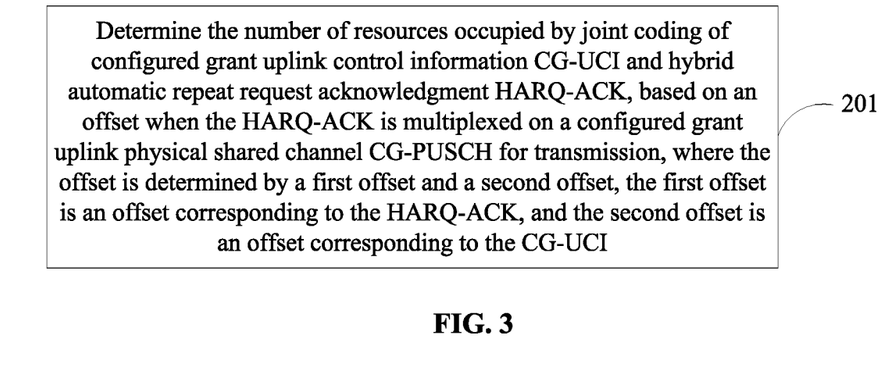
FIG. 3 is a schematic flowchart of a resource determining method of a network-side device according to an embodiment of the present disclosure.

An embodiment of the present disclosure further provides a resource determining method applied to a network-side device and, as shown in FIG. 3, including the following steps.

Step 201: Determine the number of resources occupied by joint coding of configured grant uplink control information CG-UCI and hybrid automatic repeat request acknowledgment HARQ-ACK, based on an offset when the HARQ-ACK is multiplexed on a configured grant physical uplink shared channel CG-PUSCH for transmission, where the offset is determined by a first offset and a second offset, the first offset is an offset corresponding to the HARQ-ACK, and the second offset is an offset corresponding to the CG-UCI.

In this embodiment, when the HARQ-ACK is multiplexed on the CG-PUSCH for transmission, the terminal and the network-side device can determine the offset based on the first offset corresponding to the HARQ-ACK and the second offset corresponding to the CG-UCI, and determine, based on the offset, the number of resources occupied by joint coding of the CG-UCI and the HARQ-ACK, so that the network-side device can correctly decode the CG-UCI and the HARQ-ACK, and effectiveness of communication is improved.

Optionally, the offset is any one of the following:
the first offset;
the second offset; a larger value of the first offset and the second offset;
a smaller value of the first offset and the second offset;
an average value of the first offset and the second offset; and
a weighted average value of the first offset and the second offset.

When the offset is the average value of the first offset and the second offset, and the offset $\beta_{offset}^{PUSCH}=(\beta_{offset}^{CG-UCI}+\beta_{offset}^{HARQ-ACK})/2$, where $\beta_{offset}^{CG-UCI}$ is the offset corresponding to the CG-UCI, and $\beta_{offset}^{HARQ-ACK}$ is the offset corresponding to the HARQ-ACK.

When the offset is the weighted average value of the first offset and the second offset, the weighted average value is obtained after weighting is performed based on the number of HARQ-ACK bits and the number of CG-UCI bits.

That is, $\beta_{offset}^{PUSCH}=(\beta_{offset}^{CG-UCI}*O_{CG-UCI}+\beta_{offset}^{HARQ-ACK}*O_{HARQ-ACK})/(O_{CG-UCI}+O_{HARQ-ACK})$.

Herein, $O_{CG-UCI}$ and $O_{HARQ-ACK}$ are the number of CG-UCI bits and the number of HARQ-ACK bits respectively.

In an example embodiment of the present disclosure, the first offset is configured by radio resource control RRC signaling; or the first offset is indicated by downlink control information (DCI).

In an example embodiment of the present disclosure, the second offset is configured by RRC signaling; or
the second offset is indicated by DCI.

In a specific embodiment of the present disclosure, the offset (betaoffset) of the CG-PUSCH in the NRU is configured as follows.

```
ConfiguredGrantConfig ::=       SEQUENCE {
...
CG-UCI-OnPUSCH ::= CHOICE {
dynamic                         SEQUENCE (SIZE (1..4)) OF BetaOffsets,
semiStatic                      BetaOffsets
}
BetaOffsets ::=                 SEQUENCE {
betaOffsetCG-UCI-r16            INTEGER(0..31)       OPTIONAL, -- Need S
betaOffsetACK-Index1            INTEGER(0..31)       OPTIONAL, -- Need S
betaOffsetACK-Index2            INTEGER(0..31)       OPTIONAL, -- Need S
betaOffsetACK-Index3            INTEGER(0..31)       OPTIONAL, --
Need S
  betaOffsetCSI-Part1-Index1    INTEGER(0..31)       OPTIONAL, -- Need S
  betaOffsetCSI-Part1-Index2    INTEGER(0..31)       OPTIONAL, --
NeedS
  betaOffsetCSI-Part2-Index1    INTEGER(0..31)       OPTIONAL, -- Need S
  betaOffsetCSI-Part2-Index2    INTEGER(0..31)
OPTIONAL-- Need S
}
```

The offset BetaOffsets may be configured by RRC signaling or indicated by DCI. When BetaOffsets is configured by the RRC signaling, the RRC signaling configures indexes corresponding to offsets of CG-UCI, HARQ-ACK, CSI part 1, and CSI part 2, respectively. As shown in tables 1 to 3, Table 1 shows a mapping relationship between offsets of the CG-UCI configured by higher layers and indexes, where the index is $I_{offset}^{CG-UCI}$; Table 2 shows a mapping relationship between offsets of the HARQ-ACK configured by higher layers and indexes, where the index is $I_{offset,0}^{HARQ-ACK}$, $I_{offset,1}^{HARQ-ACK}$, or $I_{offset,2}^{HARQ-ACK}$, and $I_{offset,0}^{HARQ-ACK}$, $I_{offset,1}^{HARQ-ACK}$, and $I_{offset,2}^{HARQ-ACK}$ are offset indexes of the HARQ-ACK that correspond to different numbers of HARQ-ACK bits (for example, less than or equal to 2 bits, greater than 2 bits and less than or equal to 11 bits, and greater than 11 bits), respectively; and Table 3 shows a mapping relationship between offsets of CSI configured by higher layers and indexes, where $\beta_{offset}^{CSI-1}$ and $\beta_{offset}^{CSI-1}$ indicate an offset of CSI part 1 and an offset of CSI part 2 respectively. $I_{offset,0}^{SCI-1}$, $I_{offset,1}^{CSI-1}$, $I_{offset,0}^{CSI-2}$, and $I_{offset,1}^{CSI-2}$ are indexes corresponding to CSI part 1 less than or equal to 11 bits, CSI part 1 greater than 11 bits, CSI part 2 less than or equal to 11 bits, and CSI part 2 greater than 11 bits, respectively. Alternatively, a mapping table of the CG-UCI is the same as a mapping table of the HARQ-ACK.

TABLE 1

| $I_{offset}^{CG-UCI}$ | $\beta_{offset}^{CG-UCI}$ |
|---|---|
| 0 | 1.000 |
| 1 | 2.000 |
| 2 | 2.500 |
| ... | ... |
| 30 | Reserved |
| 31 | Reserved |

TABLE 2

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
|---|---|
| 0 | 1.000 |
| 1 | 2.000 |
| 2 | 2.500 |
| ... | ... |
| 30 | Reserved |
| 31 | Reserved |

TABLE 3

| $I_{offset,1}^{CSI-1}$ $I_{offset,0}^{CSI-1}$ or $I_{offset,0}^{CSI-2}$ or $I_{offset,1}^{CSI-2}$ | $\beta_{offset}^{CSI-1}$ $\beta_{offset}^{CSI-2}$ |
|---|---|
| 0 | 1.000 |
| 1 | 2.000 |
| 2 | 2.500 |
| ... | ... |
| 30 | Reserved |
| 31 | Reserved |

When the offset is indicated by the DCI, RRC is used to configure a combination of 4 offsets, and each code point corresponding to a betaoffset indicator field in the DCI indicates a combination of offsets of CG-UCI, HARQ-ACK, CSI part 1, and CSI part 2, as shown in Table 4 below.

TABLE 4

| beta_offset indicator | $(I_{offset}^{CG-UCI})$, $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ |
|---|---|
| '00' | 1st offset index provided by higher layers |
| '01' | 2nd offset index provided by higher layers |

TABLE 4-continued

| beta_offset indicator | $(I_{offset}^{CG-UCI})$, $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ |
|---|---|
| '10' | 3rd offset index provided by higher layers |
| '11' | 4th offset index provided by higher layers |

Herein, '00' is a first offset index configured by higher layers, '01' is a second offset index configured by higher layers, '10' is a third offset index configured by higher layers, and '11' is a fourth offset index configured by higher layers. The offset indexes may indicate a combination of offsets.

In the NRU, when the HARQ-ACK is transmitted on the CG-PUSCH, the HARQ-ACK and the CG-UCI are jointly coded and mapped. For transmission of the CG-UCI and the HARQ-ACK, the number of coded modulation symbols per layer $Q'_{ACK+CG-UCI}$ is determined according to the following equation:

$$Q'_{ACK+CG-UCI} = \min\left\{\left\lceil \frac{(O_{ACK+CG-CUI} + L_{ACK+CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

Herein, $O_{ACK+CG-UCI}$ is a sum of the number of HARQ-ACK bits and the number of CG-UCI bits, that is, $O_{ACK+CG-UCI}=O_{ACK}+O_{CG-UCI}$; $O_{ACK}$ is the number of HARQ-ACK bits, $O_{CG-UCI}$ is the number of CG-UCI bits, and $L_{ACK+CG-UCI}$ is the number of cyclic redundancy check (CRC) bits for the HARQ-ACK and the CG-UCI. For example, if $O_{ACK+CG-UCI} \geq 360$, $L_{ACK+CG-UCI}=11$, otherwise $L_{ACK+CG-UCI}$ is the number of scrambled cyclic redundancy check CRC bits for the CG-UCI and the HARQ-ACK that is determined according to a related protocol.

Herein, $\beta_{offset}^{PUSCH}$ is an offset corresponding to joint coding of the CG-UCI and the HARQ-ACK and is determined according to any one of the following equations:

$$\beta_{offset}^{PUSCH} = \beta_{offset}^{HARQ-ACK};$$

$$\beta_{offset}^{PUSCH} = \beta_{offset}^{CG-UCI};$$

$$\beta_{offset}^{PUSCH} = \max(\beta_{offset}^{CG-UCI}, \beta_{offset}^{HARQ-ACK});$$

$$\beta_{offset}^{PUSCH} = \min(\beta_{offset}^{CG-UCI}, \beta_{offset}^{HARQ-ACK});$$

$$\beta_{offset}^{PUSCH} = (\beta_{offset}^{CG-UCI} + \beta_{offset}^{HARQ-ACK})/2;$$

$$\beta_{offset}^{PUSCH} = \frac{\beta_{offset}^{CG-UCI} * O_{offset}^{CG-UCI} + \beta_{offset}^{HARQ-ACK} * O_{offset}^{HARQ-ACK}}{O_{offset}^{CG-UCI} + O_{offset}^{HARQ-ACK}}.$$

It should be noted that as described above, the offset $\beta_{offset}^{HARQ-ACK}$ corresponding to the HARQ-ACK is the number of HARQ-ACK bits and correspond to different offset indexes: $I_{offset,0}^{HARQ-ACK}$, $I_{offset,1}^{HARQ-ACK}$, and $I_{offset,2}^{HARQ-ACK}$, respectively, and $\beta_{offset}^{HARQ-ACK}$ in any one of the foregoing equations may be an offset index determined only based on the number of HARQ-ACK bits, or may be an offset index determined based on a sum of the number of HARQ-ACK bits and the number of CG-UCI bits. With the number of HARQ-ACK bits being 2 and the number of CG-UCI bits being 10, if $\beta_{offset}^{HARQ-ACK}$ in any one of the foregoing equations is an offset index: $I_{offset,0}^{HARQ-ACK}$, $I_{offset,1}^{HARQ-ACK}$, or $I_{offset}^{HARQ-ACK}$ determined only based on the number of HARQ-ACK bits, $\beta_{offset}^{HARQ-ACK}$ is a value corresponding to an offset index $I_{offset,0}^{HARQ-ACK}$ corresponding to 2-bit HARQ-ACK. If $\beta_{offset}^{HARQ-ACK}$ is an offset index: $I_{offset,0}^{HARQ-ACK}$, $I_{offset,1}^{HARQ-ACK}$, and $I_{offset,2}^{HARQ-ACK}$ determined based on a sum of the number of HARQ-ACK bits and the number of CG-UCI bits, $\beta_{offset}^{HARQ-ACK}$ is a value corresponding to an offset index $I_{offset,2}^{HARQ-ACK}$ corresponding to 12-bit HARQ-ACK.

In the foregoing equations, $C_{UL-SCH}$ is the number of code blocks for an uplink shared channel (UL-SCH) of a PUSCH transmission.

If a DCI format for scheduling the PUSCH transmission includes a CBGTI field, the field indicates that UE should not transmit the r-th code block, and $K_r=0$; otherwise, $K_r$ is the r-th code block size for UL-SCH of the PUSCH transmission.

$M_{sc}^{PUSCH}$ is a scheduled bandwidth of the PUSCH transmission, and indicates the number of scheduled subcarriers.

$M_{sc}^{PT-RS}(l)$ is the number of subcarriers that carry a phase tracking reference signal (PTRS) in OFDM symbol l in the PUSCH transmission.

$M_{sc}^{UCI}(l)$ is the number of resource elements that are usable for transmission of UCI in the OFDM symbol l, where $l=0, 1, 2, \ldots, N_{symb,all}^{PUSCH}-1$. In PUSCH transmission, $N_{symb,all}^{PUSCH}$ is a total number of OFDM symbols of a PUSCH, including all OFDM symbols for a demodulation reference signal (DMRS).

For any OFDM symbol that carries DMRS of the PUSCH, $M_{sc}^{UCI}(l)=0$.

For any OFDM symbol that does not carry DMRS of the PUSCH, $M_{sc}^{UCI}(l)=M_{sc}^{PUSCH}-M_{sc}^{PT-RS}(l)$.

$\alpha$ is a parameter configured by a higher-layer parameter, for example, scaling.

$l_0$ is an index of a symbol at which the CG-UCI and the HARQ-ACK start mapping, that is, a symbol index of the 1st OFDM symbol that does not carry DMRS, after the first DMRS symbol(s), in PUSCH transmission.

In another specific embodiment of the present disclosure, RRC is used to configure that the HARQ-ACK is allowed to be multiplexed on the CG-PUSCH, for example, cg-CG-UCI-Multiplexing='enable'. At a specific transmission location, if no HARQ-ACK is multiplexed on the CG-PUSCH, the CG-UCI is individually coded during PUSCH transmission, and betaoffset $\beta_{offset}^{CG-UCI}$ corresponding to the CG-UCI is used to determine the number of modulation symbols per layer for CG-UCI transmitted on the CG-PUSCH and is determined according to the following equation:

$$Q'_{CG-UCI} = \min\left\{\left\lceil\frac{(O_{CG-CUI}+L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=l_0}^{N_{symb,all}^{PUSCH}-1} M_{sc}^{UCI}(l)\right\rceil\right\}$$

or $$Q'_{CG-UCI} = \min\left\{\left\lceil\frac{(O_{CG-CUI}+L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\sum_{l=l_0}^{N_{symb,all}^{PUSCH}-1} M_{sc}^{UCI}(l)\right\rceil\right\}.$$

Herein, $\beta_{offset}^{PUSCH} = \beta_{offset}^{CG-UCI}$.

Figure 4:
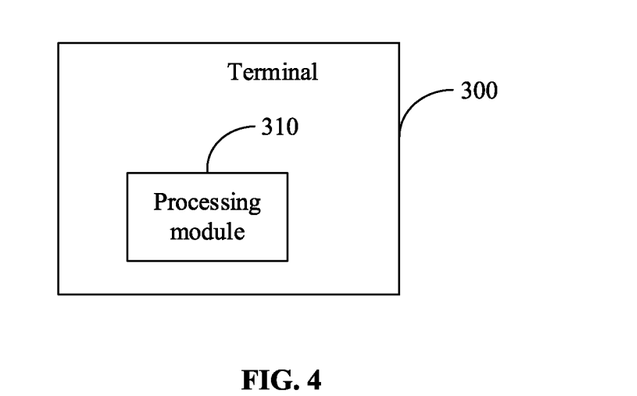
FIG. 4 is a schematic diagram of a modular structure of a terminal according to an embodiment of the present disclosure.

As shown in FIG. 4, a terminal 300 in an embodiment of the present disclosure includes a resource determining apparatus, and can implement the resource determining method in the foregoing embodiments, with the same effects achieved. The terminal 300 specifically includes the following functional modules:

a processing module 310, configured to determine, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and a second offset, the first offset is an offset corresponding to the HARQ-ACK, and the second offset is an offset corresponding to the CG-UCI.

In this embodiment, when the HARQ-ACK is multiplexed on the CG-PUSCH for transmission, the terminal can determine the offset based on the first offset corresponding to the HARQ-ACK and the second offset corresponding to the CG-UCI, and determine, based on the offset, the number of resources occupied by joint coding of the CG-UCI and the HARQ-ACK, so that the network-side device can correctly decode the CG-UCI and the HARQ-ACK, and effectiveness of communication is improved.

Optionally, the offset is any one of the following:
the first offset;
the second offset; a larger value of the first offset and the second offset;
a smaller value of the first offset and the second offset;
an average value of the first offset and the second offset; and
a weighted average value of the first offset and the second offset.

When the offset is the average value of the first offset and the second offset, and the offset $\beta_{offset}^{PUSCH} = (\beta_{offset}^{CG-UCI} + \beta_{offset}^{HARQ-ACK})/2$, where $\beta_{offset}^{CG-UCI}$ is the offset corresponding to the CG-UCI, and $\beta_{offset}^{HARQ-ACK}$ is the offset corresponding to the HARQ-ACK.

When the offset is the weighted average value of the first offset and the second offset, the weighted average value is obtained after weighting is performed based on the number of HARQ-ACK bits and the number of CG-UCI bits.

That is, $\beta_{offset}^{PUSCH} = (\beta_{offset}^{CG-UCI} * O_{CG-UCI} + \beta_{offset}^{HARQ-ACK} * O_{HARQ-ACK})/(O_{CG-UCI} + O_{HARQ-ACK})$.

Herein, $O_{CG-UCI}$ and $O_{HARQ-ACK}$ are the number of CG-UCI bits and the number of HARQ-ACK bits respectively.

In an example embodiment of the present disclosure, the first offset is configured by radio resource control RRC signaling; or the first offset is indicated by downlink control information (DCI).

In an example embodiment of the present disclosure, the second offset is configured by RRC signaling; or the second offset is indicated by DCI.

Figure 5:
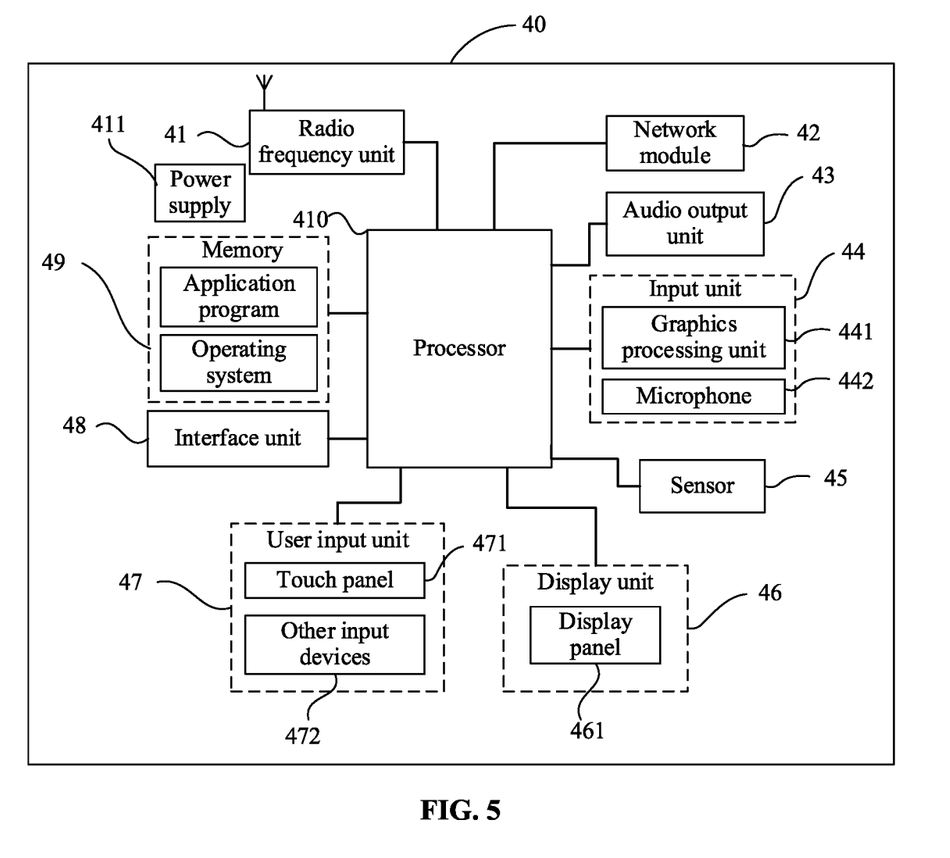
FIG. 5 is a block diagram of a terminal according to an embodiment of the present disclosure.

To better achieve the foregoing objective, further, FIG. 5 is a schematic diagram of a hardware structure of a terminal for implementing each embodiment of the present disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art can understand that the structure of the terminal shown in FIG. 5 does not constitute any limitation on the terminal, and the terminal may include more or fewer components than shown in the diagram, or some components may be combined, or the components may be arranged in different manners. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 410 is configured to determine, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and a second offset, the first offset is an offset corresponding to the HARQ-ACK, and the second offset is an offset corresponding to the CG-UCI.

It should be understood that, in this embodiment of the present disclosure, the radio frequency unit 41 may be configured to receive or transmit a signal in an information receiving/transmitting or call process. Specifically, the radio frequency unit 41 receives downlink data from a base station, transmits the downlink data to the processor 410 for processing, and also transmits uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may further communicate with a network and another device by using a wireless communications system.

The terminal provides a user with wireless broadband Internet access by using the network module 42, for example, helping the user to receive and send e-mails, browse web pages, and access streaming media.

The audio output unit 43 may convert audio data received by the radio frequency unit 41 or the network module 42 or stored in the memory 49 into an audio signal and output the audio signal as a sound. In addition, the audio output unit 43 may further provide audio output (for example, a call signal received tone or a message received tone) that is related to a specific function performed by the terminal 40. The audio output unit 43 includes a speaker, a buzzer, a receiver, and the like.

The input unit 44 is configured to receive an audio signal or a video signal. The input unit 44 may include a graphics processing unit (GPU) 441 and a microphone 442. The graphics processing unit 441 processes image data of a static picture or a video that is obtained by an image capture apparatus (for example, a camera) in a video capture mode or an image capture mode. A processed image frame may be displayed on the display unit 46. The image frame processed by the graphics processing unit 441 may be stored in the memory 49 (or another storage medium) or transmitted by using the radio frequency unit 41 or the network module 42. The microphone 442 can receive a sound and process the sound into audio data. The processed audio data may be converted into a format that can be transmitted to a mobile communication base station through the radio frequency unit 41 in a telephone call mode, for outputting.

The terminal 40 further includes at least one sensor 45, for example, an optical sensor, a motion sensor, and other sensors. Specifically, the optical sensor may include an ambient light sensor and a proximity sensor. The ambient light sensor may adjust luminance of the display panel 461 based on brightness of ambient light. The proximity sensor may turn off the display panel 461 and/or backlight when the terminal 40 moves to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 45 may also include a fingerprint sensor, a pressure sensor, an iris sensor, a molecular sensor, a gyroscope, a barometer, a hygrometer, a thermometer, an infrared sensor, and the like. Details are not described herein again.

The display unit 46 is configured to display information input by the user or information provided to the user. The display unit 46 may include the display panel 461. The display panel 461 may be configured in a form of a liquid crystal display (LCD), an organic light-emitting diode (OLED), or the like.

The user input unit 47 may be configured to receive input digit or character information, and generate key signal input associated with user settings and function control of the terminal. Specifically, the user input unit 47 includes a touch panel 471 and other input devices 472. The touch panel 471, also referred to as a touchscreen, may capture a touch operation performed by a user on or near the touch panel (for example, an operation performed by the user on the touch panel 471 or near the touch panel 471 by using a finger or any appropriate object or accessory such as a stylus). The touch panel 471 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 410, receives a command transmitted by the processor 410, and executes the command. In addition, the touch panel 471 may be implemented in a plurality of forms, for example, as a resistive, capacitive, infrared, or surface acoustic wave touch panel. In addition to the touch panel 471, the user input unit 47 may further include other input devices 472. Specifically, the other input devices 472 may include but are not limited to a physical keyboard, a function key (such as a volume control key or a switch key), a trackball, a mouse, and a joystick. Details are not described herein.

Further, the touch panel 471 may cover the display panel 461. When detecting a touch operation on or near the touch panel 471, the touch panel 471 transmits the touch operation to the processor 410 to determine a type of a touch event. Then, the processor 410 provides a corresponding visual output on the display panel 461 based on the type of the touch event. In FIG. 5, the touch panel 471 and the display panel 461 serve as two separate components to implement input and output functions of the terminal. However, in some embodiments, the touch panel 471 and the display panel 461 may be integrated to implement the input and output functions of the terminal. This is not specifically limited herein.

The interface unit 48 is an interface between an external apparatus and the terminal 40. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 48 may be configured to receive an input (for example, data information or power) from the external apparatus and transmit the received input to one or more elements within the terminal 40, or may be configured to transmit data between the terminal 40 and the external apparatus.

The memory 49 may be configured to store software programs and various data. The memory 49 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 49 may include a high-speed random access memory, and may further include a non-volatile memory such as a disk storage device, a flash memory device, or another volatile solid-state storage device.

The processor 410 is a control center of the terminal, and is connected to all components of the terminal by using various interfaces and lines. By running or executing software programs and/or modules that are stored in the memory 49 and calling data stored in the memory 49, the processor 410 executes various functions of the terminal and processes data, so as to perform overall monitoring on the terminal. The processor 410 may include one or more processing units. Optionally, an application processor and a modem processor may be integrated into the processor 410. The application processor mainly processes an operating system, a user interface, an application program, and the like. The modem processor mainly processes wireless communication. It can be understood that the modem processor may alternatively be not integrated in the processor 410.

The terminal 40 may further include a power supply 411 (for example, a battery) that supplies power to the components. Optionally, the power supply 411 may be logically connected to the processor 410 through a power management system, so as to implement functions such as charging management, discharging management, and power consumption management through the power management system.

In addition, the terminal 40 includes some functional modules that are not shown. Details are not described herein.

Optionally, an embodiment of the present disclosure further provides a terminal, including a processor 410, a memory 49, and a computer program stored in the memory 49 and capable of running on the processor 410. When the computer program is executed by the processor 410, the processes of the foregoing embodiments of the resource determining method are implemented, with the same technical effects achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or a user device (User Equipment). This is not limited herein.

An embodiment of the present disclosure further provides a computer-readable storage medium, where the computer-readable storage medium stores a computer program. When the computer program is executed by a processor, the processes of the foregoing embodiments of the resource determining method on a terminal side are implemented, with the same technical effects achieved. To avoid repetition, details are not described herein again. For example, the computer-readable storage medium is a read-only memory (ROM), a random access memory (RAM), a magnetic disk, or an optical disc.

Figure 6:
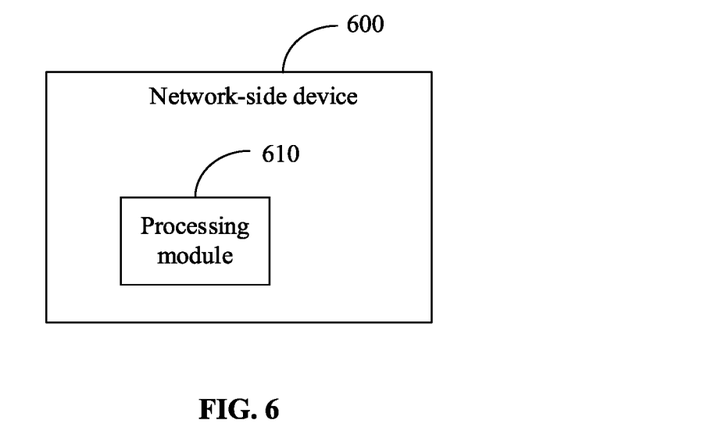
FIG. 6 is a schematic modular structural diagram of a network-side device according to an embodiment of the present disclosure.

As shown in FIG. 6, a network-side device 600 in an embodiment of the present disclosure includes a resource determining apparatus, and can implement the resource determining method in the foregoing embodiments, with the same effects achieved. The network-side device 600 specifically includes the following functional modules:

a processing module 610, configured to determine, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and a second offset, the first offset is an offset corresponding to the HARQ-ACK, and the second offset is an offset corresponding to the CG-UCI.

In this embodiment, when the HARQ-ACK is multiplexed on the CG-PUSCH for transmission, the network-side device can determine the offset based on the first offset corresponding to the HARQ-ACK and the second offset corresponding to the CG-UCI, and determine, based on the offset, the number of resources occupied by joint coding of the CG-UCI and the HARQ-ACK, so that the network-side device can correctly decode the CG-UCI and the HARQ-ACK, and effectiveness of communication is improved.

Optionally, the offset is any one of the following:

the first offset;

the second offset; a larger value of the first offset and the second offset;

a smaller value of the first offset and the second offset;

an average value of the first offset and the second offset; and a weighted average value of the first offset and the second offset.

When the offset is the average value of the first offset and the second offset, and the offset $\beta_{offset}^{PUSCH} = (\beta_{offset}^{CG-UCI} + \beta_{offset}^{HARQ-ACK})/2$, where $\beta_{offset}^{CG-UCI}$ is the offset corresponding to the CG-UCI, and $\beta_{offset}^{HARQ-ACK}$ is the offset corresponding to the HARQ-ACK.

When the offset is the weighted average value of the first offset and the second offset, the weighted average value is obtained after weighting is performed based on the number of HARQ-ACK bits and the number of CG-UCI bits.

That is $\beta_{offset}^{PUSCH} = (\beta_{offset}^{CG-UCI} * O_{CG-UCI} + \beta_{offset}^{HARQ-ACK} * O_{HARQ-ACK})/((O_{CG-UCI} + O_{HARQ-ACK})$.

Herein, $O_{CG-UCI}$ and $O_{HARQ-ACK}$ are the number of CG-UCI bits and the number of HARQ-ACK bits respectively.

In an example embodiment of the present disclosure, the first offset is configured by radio resource control RRC signaling; or the first offset is indicated by downlink control information (DCI).

In an example embodiment of the present disclosure, the second offset is configured by RRC signaling; or the second offset is indicated by DCI.

It should be noted that, it should be understood that division of modules of the network-side device and the terminal is merely logical function division. The modules may be all or partially integrated in a physical entity or may be physically separated in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a receiving module may be a processing component that is separately disposed, or may be integrated in a chip of the apparatus for implementation. In addition, the receiving module may be stored in the memory of the apparatus in a form of program code, and is invoked by a processing component of the apparatus to perform a function of the receiving module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the modules above may be one or more integrated circuits configured to implement the foregoing method, for example, one or more application-specific integrated circuits (ASIC), or one or more microprocessors (digital signal processor, DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

To better achieve the foregoing objective, an embodiment of the present disclosure further provides a network-side device. The network-side device includes a processor, a memory, and a computer program stored in the memory and capable of running on the processor, where when the computer program is executed by the processor, the steps of the foregoing resource determining method are implemented, with the same technical effects achieved. To avoid repetition, details are not described herein again.

Figure 7:
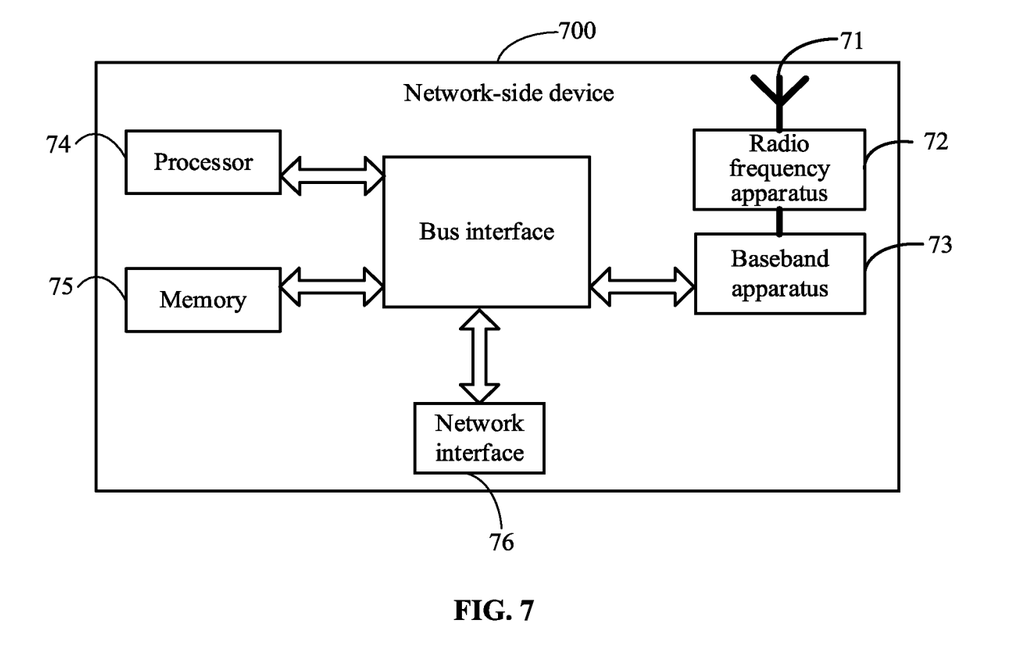
FIG. 7 is a block diagram of a network-side device according to an embodiment of the present disclosure.

Specifically, an embodiment of the present disclosure further provides a network-side device. As shown in FIG. 7, the network-side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and transmits the received information to the baseband apparatus 73 for processing. In a downlink direction, the baseband apparatus 73 processes to-be-transmitted information, and transmits the information to the radio frequency apparatus 72; and the radio frequency apparatus 72 processes the received information and then transmits the information by using the antenna 71.

The frequency band processing apparatus may be located in the baseband apparatus 73. The method performed by the network-side device in the foregoing embodiment may be implemented by the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 7, one of the chips is, for example, the processor 74, and connected to the memory 75, to invoke the program in the memory 75 to perform the operations of the network-side device shown in the foregoing method embodiment.

The baseband apparatus 73 may further include a network interface 76, configured to exchange information with the radio frequency apparatus 72, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the network-side device, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synch link dynamic random access memory (Synch Link DRAM, SLDRAM), and a direct rambus random access memory (Direct Rambus RAM, DRRAM). The memory 75 described in this application is intended to include but is not limited to these and any other suitable types of memories.

Specifically, the network-side device in this embodiment of the present disclosure further includes a computer program stored in the memory 75 and capable of running on the processor 74. The processor 74 invokes the computer program in the memory 75 to perform the method performed by each module shown in FIG. 6.

Specifically, the computer program, when invoked by the processor 74, can be configured to determine, based on an offset, the number of resources occupied by joint coding of configured grant uplink control information CG-UCI and hybrid automatic repeat request acknowledgment HARQ-ACK when the HARQ-ACK is multiplexed on a configured grant physical uplink shared channel CG-PUSCH for transmission, where the offset is determined by a first offset and a second offset, the first offset is an offset corresponding to the HARQ-ACK, and the second offset is an offset corresponding to the CG-UCI.

An embodiment of the present disclosure further provides a computer-readable storage medium, where the computer-readable storage medium stores a computer program. When the computer program is executed by a processor, the steps of the foregoing resource determining method applied to a network-side device are implemented, with the same technical effects achieved. To avoid repetition, details are not described herein again.

A person of ordinary skill in the art may realize that units and algorithm steps of various examples described with reference to the embodiments disclosed in this specification can be implemented by using electronic hardware, or a combination of a computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It can be clearly understood by a skilled person in the art that, for convenient and brief description, for a detailed working process of the systems, apparatuses, and units in the foregoing description, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network-side device, or the like) to perform all or some of the steps of the method described in the embodiments of the present disclosure. The foregoing storage medium includes: any medium that can store program code, such as a USB flash drive, a removable hard disk, a ROM, a RAM, a magnetic disk, or an optical disc.

In addition, it should be noted that in the apparatus and method of the present disclosure, apparently, the components or steps may be decomposed and/or recombined. The decomposition and/or recombination should be considered as an equivalent solution of the present disclosure. In addition, the steps for performing the foregoing series of processing may be performed in a chronological order, but do not necessarily need to be performed in a chronological order. Some steps may be performed in parallel or independently. A person of ordinary skill in the art can understand that all or any of the steps or components of the method and the apparatus in the present disclosure may be implemented in any computing apparatus (including a processor, a storage medium, and the like) or a network of computing apparatuses through hardware, firmware, software, or a combination thereof. This can be implemented by a person of ordinary skill in the art who has read the descriptions of the present disclosure, by using their basic programming skills.

Therefore, the objectives of the present disclosure can also be implemented by running a program or a set of programs on any computing apparatus. The computing apparatus may be a general apparatus of common sense. Therefore, the objective of the present disclosure may also be implemented by providing only a program product that includes program code for implementing the method or apparatus. Therefore, such program product also constitutes the present disclosure, and a storage medium storing such program product also constitutes the present disclosure. Apparently, the storage medium may be any storage medium of common sense or any storage medium that will be developed in the future. It should also be noted that in the apparatus and method of the present disclosure, apparently, the components or steps may be decomposed and/or recombined. The decomposition and/or recombination should be considered as an equivalent solution of the present disclosure. In addition, the steps for performing the foregoing series of processing may be performed in a chronological order, but do not necessarily need to be performed in a chronological order. Some steps may be performed in parallel or separate from each other.

The foregoing descriptions are preferred implementations of the present disclosure. It should be noted that a person of ordinary skill in the art may make several improvements or polishing without departing from the principle of the present disclosure and the improvements or polishing shall fall within the protection scope of the present disclosure

What is claimed is:

1. A resource determining method, applied to a terminal and comprising:

determining, based on an offset $\beta_{offset}^{PUSCH}$, the number of resources occupied by joint coding of configured grant uplink control information (CG-UCI) and hybrid automatic repeat request acknowledgment (HARQ-ACK) when the HARQ-ACK is multiplexed on a configured grant physical uplink shared channel (CG-PUSCH) for transmission, wherein the CG-UCI comprises an HARQ identity (ID), a new data indicator (NDI) and/or a redundancy version (RV); the offset $\beta_{offset}^{PUSCH}$ is determined by a first offset, the first offset is an offset $\beta_{offset}^{HARQ-ACK}$ of the HARQ-ACK; wherein the offset $\beta_{offset}^{PUSCH}$ corresponding to joint coding of the CG-UCI and the HARQ-ACK is determined according to the following equation:

$\beta_{offset}^{PUSCH} = \beta_{offset}^{HARQ-ACK}$, wherein the $\beta_{offset}^{HARQ-ACK}$ is determined based on a sum of the number of HARQ-ACK bits and the number of CG-UCI bits.

2. The resource determining method according to claim 1, wherein the first offset is configured by radio resource control (RRC) signaling; or the first offset is indicated by downlink control information (DCI).

3. The resource determining method according to claim 1, wherein for transmission of the CG-UCI and the HARQ-ACK, the number of coded modulation symbols per layer $Q'_{ACK+CG-UCI}$ is determined according to the following equation:

$$Q'_{ACK+CG-UCI} = \min\left\{ \left\lceil \frac{(O_{ACK+CG-CUI} + L_{ACK+CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$, wherein $O_{ACK+CG-UCI}$ is a sum of the number of HARQ-ACK bits and the number of CG-UCI bits, $L_{ACK+CG-UCI}$ is the number of cyclic redundancy check (CRC) bits for the HARQ-ACK and the CG-UCI, $\beta_{offset}^{PUSCH}$ is the offset corresponding to joint coding of the CG-UCI and the HARQ-ACK, $C_{UL-SCH}$ is the number of code blocks for an uplink shared channel (UL-SCH) of a PUSCH transmission, Kr is the r-th code block size for UL-SCH of the PUSCH transmission, $M_{sc}^{PUSCH}$ is a scheduled bandwidth of the PUSCH transmission, l is an index of an OFDM symbol in the PUSCH transmission, $M_{sc}^{UCI}(l)$ is the number of resource elements that are usable for transmission of UCI in the OFDM symbol l, and l=0, 1, 2, . . . , $N_{symb,all}^{PUSCH}-1$.

4. A non-transitory computer-readable storage medium, wherein the computer-readable storage medium stores a computer program, and when the computer program is executed by a processor, the steps of the resource determining method according to claim 1 are implemented.

5. A terminal, wherein the terminal comprises a processor, a memory, and a computer program stored in the memory and running on the processor, wherein when the processor executes the computer program, a resource determining method is implemented, and the method comprises:

determining, based on an offset $\beta_{offset}^{PUSCH}$, the number of resources occupied by joint coding of configured grant uplink control information (CG-UCI) and hybrid automatic repeat request acknowledgment (HARQ-ACK) when the HARQ-ACK is multiplexed on a configured grant physical uplink shared channel (CG-PUSCH) for transmission, wherein the CG-UCI comprises an HARQ identity (ID), a new data indicator (NDI) and/or a redundancy version (RV); the offset $\beta_{offset}^{PUSCH}$ is determined by a first offset, the first offset is an offset $\beta_{offset}^{HARQ-ACK}$ of the HARQ-ACK; wherein the offset $\beta_{offset}^{PUSCH}$ corresponding to joint coding of the CG-UCI and the HARQ-ACK is determined according to the following equation:

$\beta_{offset}^{PUSCH} = \beta_{offset}^{HARQ-ACK}$, wherein the $\beta_{offset}^{HARQ-ACK}$ is determined based on a sum of the number of HARQ-ACK bits and the number of CG-UCI bits.

6. The terminal according to claim 5, wherein the first offset is configured by radio resource control (RRC) signaling; or the first offset is indicated by downlink control information (DCI).

7. The terminal according to claim 5, wherein for transmission of the CG-UCI and the HARQ-ACK, the number of coded modulation symbols per layer $Q'_{ACK+CG-UCI}$ is determined according to the following equation:

$$Q'_{ACK+CG-UCI} = \min\left\{ \left\lceil \frac{(O_{ACK+CG-CUI} + L_{ACK+CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$, wherein $O_{ACK+CG-UCI}$ is a sum of the number of HARQ-ACK bits and the number of CG-UCI bits, $L_{ACK+CG-UCI}$ is the number of cyclic redundancy check (CRC) bits for the HARQ-ACK and L the CG-UCI, $\beta_{offset}^{PUSCH}$ PUSCH is the offset corresponding to joint coding of the CG-UCI and the HARQ-ACK, $C_{UL-SCH}$ is the number of code blocks for an uplink shared channel (UL-SCH) of a PUSCH transmission, Kr is the r-th code block size for UL-SCH of the PUSCH transmission, $M_{sc}^{PUSCH}$ is a scheduled bandwidth of the PUSCH transmission, l is an index of an OFDM symbol in the PUSCH transmission, $M_{sc}^{UCI}(l)$ is the number of resource elements that are usable for transmission of UCI in the OFDM symbol l, and l=0, 1, 2, . . . , $N_{symb,\ all}^{PUSCH}-1$.

8. A network-side device, wherein the network-side device comprises a processor, a memory, and a computer program stored in the memory and running on the processor, wherein when the processor executes the computer program, a resource determining method is implemented, and the method comprises:

determining, based on an offset $\beta_{offset}^{PUSCH}$, the number of resources occupied by joint coding of configured grant uplink control information (CG-UCI) and hybrid automatic repeat request acknowledgment (HARQ-ACK) when the HARQ-ACK is multiplexed on a configured grant physical uplink shared channel (CG-PUSCH) for transmission, wherein the CG-UCI comprises an HARQ identity (ID), a new data indicator (NDI) and/or a redundancy version (RV); the offset $\beta_{offset}^{PUSCH}$ is determined by a first offset, the first offset is an offset $\beta_{offset}^{HARQ-ACK}$ of the HARQ-ACK;

wherein the offset $\beta_{offset}^{PUSCH}$ corresponding to joint coding of the CG-UCI and the PUSCH HARQ-ACK is determined according to the following equation:

$\beta_{offset}^{PUSCH}=\beta_{offset}^{HARQ-ACK}$, wherein the $\beta_{offset}^{HARQ-ACK}$ is determined based on a sum of the number of HARQ-ACK bits and the number of CG-UCI bits.

\* \* \* \* \*